I. FENTON, DEC'D.
L. FENTON, ADMINISTRATRIX.
WATER CLOSET TANK.
APPLICATION FILED APR. 9, 1915.

1,146,558.

Patented July 13, 1915.

UNITED STATES PATENT OFFICE.

ISAAC FENTON, DECEASED, LATE OF TRENTON, NEW JERSEY, BY LOUISA FENTON, ADMINISTRATRIX, OF TRENTON, NEW JERSEY.

WATER-CLOSET TANK.

1,146,558.  Specification of Letters Patent.  Patented July 13, 1915.

Application filed April 9, 1915. Serial No. 20,170.

*To all whom it may concern:*

Be it known that ISAAC FENTON, deceased, at the date of his death a citizen of the United States, residing at Trenton, county of Mercer, and State of New Jersey, did invent a new and useful Improvement in Water-Closet Tanks, of which the following is a full, clear, and exact description, reference being had to the accompanying drawings, which form a part of this specification.

The invention relates to that class of water-closet tanks equipped with inlets and outlets for water, valves controlling the inlet and outlet respectively, a float controlling the inlet valve, and an overflow pipe.

The object of the invention is to substantially simplify the construction without sacrifice of efficiency or capacity.

A preferred embodiment of the invention is shown in the accompanying drawings, in which—

Figure 1:
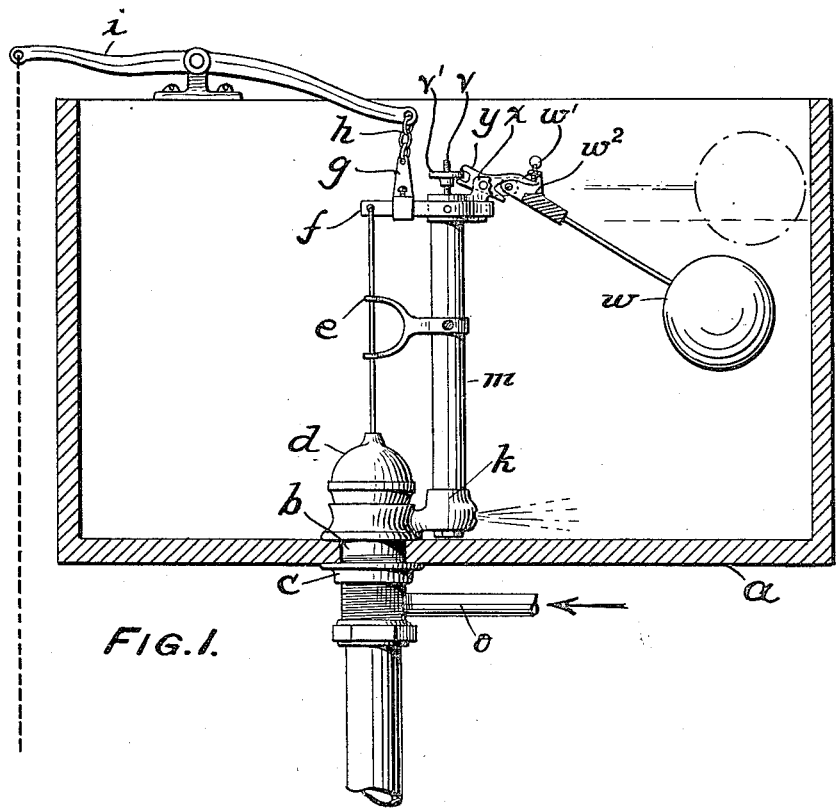
Figure 2:
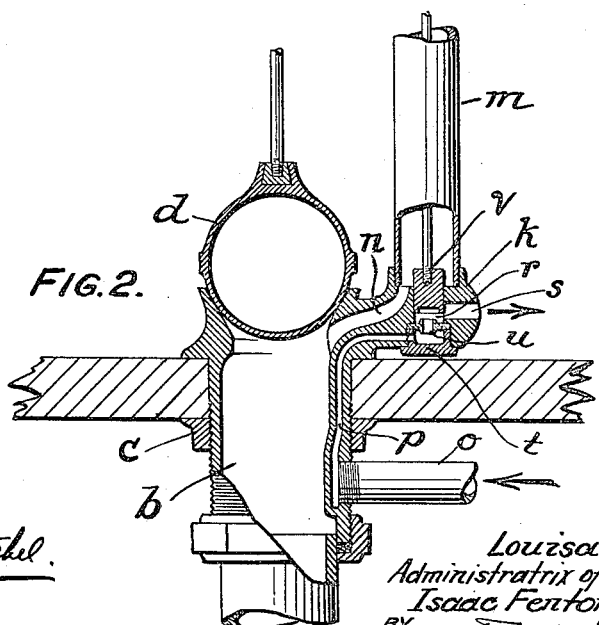

Figure 1 is a vertical sectional view through the tank. Fig. 2 is a detail vertical section through the single fitting providing for normal outflow, overflow and inflow.

Through the bottom of the tank $a$ extends an outlet pipe $b$ which is flanged to provide a seat on the tank bottom. A nut $c$ is threaded on the pipe $b$ below the tank bottom and is screwed into contact with the tank bottom to hold the outlet pipe in position.

Seated in the mouth of the outlet pipe $b$ is a flush valve $d$ having a stem slidable in a guide $e$ and attached to a lever $f$. Guide $e$ is secured, and lever $f$ is pivoted, to an overflow pipe $m$. By means of an adjustable arm $g$ and chain $h$, lever $f$ is connected with one end of a manually operated lever $i$ pivoted on the tank.

The upper end of the outflow pipe $b$ has a lateral extension $k$ provided with a valve chamber $r$. Mounted on extension $k$ is the overflow pipe $m$, which communicates with the outflow pipe $b$ by means of a channel or passage $n$ formed in member $k$. An inflow channel or passage $p$ is formed partly in extension $k$ and partly in the wall of outflow pipe $b$ and communicates at one end with an inflow pipe $o$ below the tank bottom and at the other end with the valve chamber $r$. A port $s$ opens from valve chamber $r$ to the interior of the tank.

To form valve chamber $r$, extension $k$ is bored through from top to bottom and the orifice thus formed is enlarged at its lower end and threaded to receive a closure $t$ whose annular flange has an orifice alining with the mouth of channel $p$ to allow inflow of water therefrom. A valve seat or disk $u$ having a central orifice is confined by closure $t$ against the shoulder at the base of the enlarged part of the valve chamber.

Within the valve chamber $r$ slides a valve $v$ which normally rests below the position shown in Fig. 2 so as to close port $s$ and seat against disk $u$, thereby cutting off inflow of water. The stem of valve $v$ extends up through overflow pipe $m$, its upper end being threaded to receive an adjustable nut $v'$.

Valve $v$ is controlled from float $w$ in any known manner. The arm of the float is pivoted on a bracket $x$ and carrying an adjustable screw $w'$. A lever $y$ is pivoted on bracket $x$ and has one forked end engaging nut $v'$ and the other end in position to be engaged by the screw $w'$ when the float sinks or by a shoulder $w^2$ on the float when it rises.

When the float is not in use, the tank contains water to the approximate level indicated in Fig. 1; the flush valve $d$ is seated, preventing escape of the water; the float $w$ is in the position shown in dotted lines, Fig. 1; and the valve $v$ is moved down below the position shown in Fig. 2 and against its seat $u$ so as to prevent inflow of water. If, for any reason, the float should not properly operate to close valve $v$, the water, as it rises, will escape through overflow pipe $m$, channel $n$ and outlet pipe $b$.

When the outer end of lever $i$ is pulled down, it lifts lever $f$ and flush valve $d$, allowing the contents of the tank to escape through outlet pipe $b$. During the escape of the water, float $w$ falls until it reaches a point where it actuates lever $y$, thereby lifting valve $v$ and permitting water to flow from supply pipe $o$, through channel $n$, valve chamber $r$ and port $s$, to the interior of the tank. The inflow of water continues until float $w$, rising with the water, engages lever $y$ and moves it to close valve $v$.

It will be observed that the mode of operation is not, in a broad sense, different from that of the standard water closet tank, but the construction is simplified in several respects. Thus, a single orifice in the tank and a single fitting applied thereto, provides for the normal outlet, overflow outlet and inflow. The inflow valve mechanism occupies no additional space whatever in the tank, the valve being located at the bottom of the overflow pipe and operated through a stem extending through the overflow pipe. In the case of inspection or repair, access to the working parts is facilitated. The inflow valve mechanism is simplified and is readily applied and danger of leakage around the inflow valve or other trouble is minimized. Finally, the expense of manufacture is relatively small.

Having now fully described the invention, what is claimed and desired to protect by Letters Patent is:

1. In a water closet tank, the combination with a fitting adapted for extension through the bottom of the tank and comprising an outflow pipe, a valve chamber, an inflow channel communicating with the valve chamber and an overflow channel communicating with the outflow pipe, of a flush valve for the outflow pipe, an overflow pipe mounted on the fitting and opening to the valve chamber and the overflow channel, an inflow valve movable in the valve chamber and closing communication between the same and the overflow pipe, a float, and connections between the float and the inflow valve.

2. In a water closet tank, the combination with a fitting adapted for extension through the bottom of the tank and comprising an outflow pipe, a valve chamber, an inflow channel communicating with the valve chamber and an overflow channel communicating with the outflow pipe, of a flush valve for the outlet pipe, an overflow pipe mounted on the fitting and communicating with the overflow channel, an inflow valve in the valve chamber having a stem extending through the overflow pipe, and a float connected with said stem.

3. In a water closet tank, the combination with a fitting adapted for extension through the bottom of the tank and comprising an outflow pipe, a valve chamber, an inflow channel communicating with the valve chamber and an overflow channel communicating with the outflow pipe, of a flush valve for the outflow pipe, an overflow pipe mounted on the fitting and opening to the valve chamber and the overflow channel, an inflow valve movable in the valve chamber and closing communication between the same and the overflow pipe, a valve stem extending through the overflow pipe, a float, and connections between the float and the inflow valve.

4. In a water closet tank, the combination with a fitting comprising a pipe adapted to extend through the bottom of the tank, an extension on the pipe, an overflow channel in said extension, an inflow channel formed partly in the wall of the pipe and partly in said extension, and a valve chamber in said extension, of a flush valve for the outflow pipe, a valve in the valve chamber, an overflow pipe mounted on said extension, a float, and connections between the float and the last-named valve.

5. In a water closet tank, the combination of an outflow pipe, an overflow pipe, connections between the pipes, a flush valve controlling the outflow of water through the outflow pipe, a valve controlling the inflow of water, the stem of said valve extending up through the overflow pipe, a float, and connections between the float and the inflow valve.

6. In a water closet tank, the combination of an outflow pipe, a flush valve therefor, a member bored through from top to bottom to form a valve chamber, a perforated valve seat in said chamber, a cap closing one end of the chamber, an inflow passage communicating with the chamber between the cap and valve seat, a port opening from the chamber on the other side of the valve seat, an inflow valve closing the upper end of the chamber, an overflow pipe above the valve, an outflow passage from the overflow pipe, the valve stem extending through the overflow pipe, a float and connections between the float and the stem of the inflow valve.

In testimony of which invention, I have hereunto set my hand at Trenton, New Jersey, on this third day of April, A. D. 1915.

LOUISA FENTON,

*Administratrix of the estate of Isaac Fenton, deceased.*

Copies of this patent may be obtained for five cents each, by addressing the "Commissioner of Patents, Washington, D. C."